United States Patent [19]

Inoyama et al.

[11] 4,041,294
[45] Aug. 9, 1977

[54] AUTOMATIC ASSEMBLY CONTROL METHOD AND APPARATUS THEREFORE

[75] Inventors: Tadao Inoyama, Yokohama; Tatsuo Goto, Tokyo; Kiyoo Takeyasu, Tokorozawa; Hiroshi Ishimura, Narashino; Junichi Suzuki, Ichikawa, all of Japan

[73] Assignee: Hitachi, Ltd., Japan

[21] Appl. No.: 636,835

[22] Filed: Dec. 2, 1975

[30] Foreign Application Priority Data

Dec. 4, 1974 Japan .................... 49-138393

[51] Int. Cl.² .......................................... B23Q 17/00
[52] U.S. Cl. ........................... 235/151.11; 29/732; 29/709; 29/596
[58] Field of Search ............ 29/200 C, 208 C, 407; 235/151.1, 151.11

[56] References Cited

U.S. PATENT DOCUMENTS

| 3,824,674 | 7/1974 | Inoyama et al. | 29/208 C X |
| 3,885,295 | 5/1975 | Engelberger | 29/208 C X |
| 3,893,217 | 7/1975 | Edmond | 29/208 C X |

OTHER PUBLICATIONS

"Methods and Instruments," in *Oceanology (USA)*, vol. 11, No. 3, (1971), pp. 420–425.

*Primary Examiner*—Eugene G. Botz
*Attorney, Agent, or Firm*—Craig & Antonelli

[57] ABSTRACT

An automatic assembly control apparatus employs a holding mechanism for holding a collar with a hole, to which a shaft of a motor is inserted. The holding mechanism is coupled to a positioning mechanism through an elastic mechanism so that the positioning mechanism may be controlled in response to signals representative of the displacement or deflection of the elastic mechanism. The collar is first placed in rough upon the center axis of the shaft which has a step portion at the end portion thereof and then inserted onto the shaft while its position is corrected by the positioning mechanism. The insertion of the collar is stopped when it is caught at the step portion of the shaft and then the position of the collar is changed in such a manner that the collar is inserted onto the shaft over the step portion thereof. Then, the collar is gradually inserted onto the shaft.

12 Claims, 9 Drawing Figures

AUTOMATIC ASSEMBLY CONTROL METHOD AND APPARATUS THEREFORE

BACKGROUND OF THE INVENTION

This invention relates to a method and apparatus for automatically and sequentially assembling together a first member having a bore or hole (hereinafter referred to as a collar with a hole, to which a shaft of a motor is inserted) and a second member having a projection (hereinafter referred to as a shaft of a motor), and more particularly to an automatic assembly control system for inserting the collar onto the shaft which has one step portion or more at the end portion thereof.

There has been a strong demand for automatic assembling systems for automatically assembling a collar and a shaft in view of saving man hours. However, the correction of the position of the collar with respect to the shaft and the control of the force with which the collar is inserted to the shaft must be adjusted with an extremely high degree of accuracy and sensitivity equal to that of a human depending upon the condition of engagement of the collar with the shaft For this purpose, some of the inventors of this application have proposed some techniques described in U.S. Pat. No. 3,824,674. By utilizing these techniques, the collar can be inserted to the shaft, the shape of which is uniform in the surface. In a case, however, that the shape of the shaft is complicated and variable such as a shaft having one step portion or more at the end portion thereof, these techniques cannot be used.

SUMMARY OF THE INVENTION

An object of this invention is to provide an automatic assembly control apparatus for automatically assembling together a collar with a hole and a shaft, the shape of which is complicated.

Another object of this invention is to provide an automatic assembly control apparatus with a simple control circuit.

In order to achieve the above objects, the automatic assembly control apparatus of this invention provides a holding mechanism for holding the collar with the hole and coupled to a positioning mechanism through an elastic mechanism such as springs. The holding mechanism is coupled to drive motors which drive it along respective axes of a selected coordinate system. The elastic mechanism provides displacement detectors to detect that the collar has contacted with the shaft which has a step portion at the end portion thereof. A control circuit is provided for controlling the positioning mechanism in response to programmed demand in accordance with signals derived from the displacement detectors in such a manner that the displacement or deflection may be eliminated, whereby the collar can be inserted to the shaft having the complicated shape.

According to the automatic assembly method of the present invention, the center of the collar is placed approximately in registration with the center of the shaft by the positioning mechanism. In a second step, the collar is moved toward the axial direction of the shaft until the collar is inserted onto the shaft. In a third step, when the collar is inserted partially onto the shaft, it is moved toward the axial direction thereof while the positioning mechanism may be corrected in position to eliminate the displacement or deflection. When the collar is not inserted partially onto the shaft, the positioning mechanism is moved back to the axial direction thereof to be free each other, and then the positioning mechanism is moved in accordance with a programmed searching pattern and the operation of the insertion is repeated. In a fourth step, the positioning mechanism is moved in accordance with a programmed searching pattern and the operation of the insertion is repeated, when the outputs of the displacement detectors are illuminated at the step portion of the shaft.

The above and other objects of this invention will be understood from the following description of some preferred embodiments in connection with the accompanying drawings.

DESCRIPTION OF THE PREFERRED EMBODIMENTS

Figure 1:
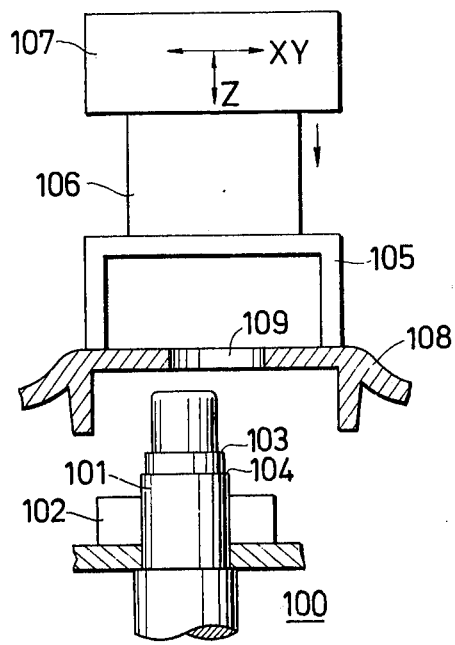
FIG. 1 is a diagram for a description of this invention.

Referring to FIG. 1 in which a portion of a motor 100 is indicated. The motor 100 assumed to be delivered to a predetermined position by a conveyor (not shown) provides a shaft 101 having step portions 103 and 104 at the end portion thereof and bearings 102. A part holding mechanism generally indicated by 105 is coupled through an elastic mechanism 106 such as springs to a part positioning mechanism generally indicated by 107 which includes a driving mechanism which, in turn, is driven in X-, Y- and Z- directions by step motors or DC motors to be described hereinafter. In the instant embodiment, the X-, Y- and Z- directions correspond to the X-, Y- and Z- coordinates axes, respectively, of a coordinate system in which the XY plane is perpendicular with respect to the center axis of the shaft 101 and the Z coordinate axis is parallel with the center axis thereof. A collar 108 having a hole 109, through which the shaft 10 is inserted thereto, is held by the holding mechanism such as an electromagnet. The term of a holding mechanism is used to refer to various mechanisms for releasably holding a part for assembly such as artificial arms and fingers and electromagnets.

Now, the positioning mechanism 107 coupled with the holding mechanism 105 through the elastic mechanism 106 will be explained in more detail in connection with FIG. 2. As described in U.S. Pat. No. 3,824,674, the positioning mechanism 107 includes the step motors 200, 201 and 202 for sliding it in the X-, Y- and Z directions. The step motors 200, 201 and 202 are controlled in response to the control signals from drive circuits 203, 204 and 205, respectively. The holding mechanism 105 includes arms 206 for holding a collar 108 and a supporter 207 for supporting the arms 206, and is coupled to the positioning mechanism 107 through crossed-leaf springs 208 upon which are bonded strain gauges 209.

Four rods 210 extending from the four corners at the undersurface of a base plate 211 fixed to the drive shaft 212 are fitted into four through holes 213 in the supporter 207, and coiled springs 214 are fitted over the rods 210 between the base plate 211 and the supporter 207. Microswitches 215 mounted over the undersurface of the supporter 207 are so arranged as to be actuated by the free end of the rods 210 extending through the holes 213. The holding mechanism 105 is suspended by the four leaf springs 208 from the drive shaft 212 of the positioning mechanism 107 when the collar 108 is out of contact with the shaft 101. When the collar 108 is gradually lowered as the Z- direction step motor 202 is driven, the leaf springs 208 as well as the coiled springs 214 are gradually contracted. In this case, the position of the holding mechanism 105 relative to the positioning mechanism 107 as well as the deflections of the leaf springs 208 may be detected from the signals from the strain gauges 209. When the drive shaft 212 is further lowered by the Z- direction step motor 202, the free ends of the rods 210 make contact with the limit switches 215, thereby actuating them. In response to the signals from the microswitch 215, the Z-direction step motor 202 is controlled so as to prevent excess pressure from being exerted to the shaft 101 from the collar 108, Next, a control circuit for controlling the positioning mechanism 107 and the holding mechanism 105 will be explained in connection with FIG. 3. A sequence controller 300 including a memory device which stores a plurality of necessary steps for control such as shifted directions, stopped positions and shifted distances, etc. of the positioning mechanism 107 generates driving signals for controlling the positioning mechanism 107 and the holding mechanism 105 and timing signals for driving external devices 303 such as a conveyor, as well as control signals for controlling an address counter 301 and a selector 302. The driving signals from the sequence controller 300 are supplied to the drive circuits 305 for the positioning mechanism 107, to a drive circuit (not shown) of the holding mechanism 105 and to the external devices 303 through a decoder 304, by which the output signals from the sequence controller 300 are converted into suitable signals for driving them. The selector 302 selects some signals from signals of position detectors of the positioning mechanism 107, of the displacement detectors 209, from the holding mechanism 105 and the external devices 303 due to the control signals of the sequence controller 300. An assembly control circuit 306 controls the driving circuits 305 for the positioning mechanism 107 in accordance with the siganals from the displacement detectors as will be explained hereinafter in more detail.

Now, the operation of the control circuit shown in FIG. 3 will be explained in connection with FIG. 1. The center axis of the hole 109 of the collar 108 is placed approximately in coincidence with the center axis of the shaft 101 by the shift of the positioning mechanism 107 which is controlled by the sequence controller 300, since the position of the shaft 101 is memorized in the memory device of the sequence controller previously. Next, the collar 108 is moved toward the axial direction of the shaft until the collar 108 will be inserted onto the shaft. As a result, when the collar 108 is inserted partially onto the shaft 101, it is further moved toward the axial direction thereof until the collar 108 will contact to the step portion 103 of the shaft 101, while the positioning mechanism 107 is corrected in its position to eliminate the displacement of the elastic mechanism 105 due to the assembly control circuit 306, to which the signals from the displacement detectors are supplied through the selector 302. The collar 108, however, is not always inserted onto the shaft 101 in this case since the center of the hole 109 is positioned approximately to the center axis of the shaft 101. In a case that the collar is not inserted partially onto the shaft, the collar 108 contacts to the top of the shaft 101 and is present against it by a suitable pressure. Accordingly, the collar 108 may not become free from the top of the shaft even if the assembly control circuit 306 operated. The sequence controller 300 takes following steps in this event. In a first step, the positioning mechanism 107 is moved back by the predetermined distance with respect to the Z coordinate axis in response to the signal from the sequence controller 300, whereby the collar 108 becomes free from the top of the shaft 101. In a second step, the positioning mechanism 107 is moved in the order of $P_0 \rightarrow P_1 \rightarrow P_2 \rightarrow \ldots$ on the XY plane in accordance with a searching pattern shown in FIG. 4 which is stored in the memory device of the sequence controller 300 and repeats the insertion of the collar 108 onto the shaft at each position of the searching pattern. In order to detect whether the collar 108 has been inserted to the shaft 101, the sequence controller 300 opens the gate of the selector 302 with respect to the displacement detectors and detects the outputs thereof. When the sequence controller 300 detects that the collar 108 has been inserted onto the shaft 101 at the position $P_2$, for instance, the signals from the selector 302 change the contents of the address counter 301, so that the sequence controller 300 will take a next step in accordance with the contents of the memory device in the sequence controller 300, where the next step is for inserting the collar from the top of the shaft 101 to the step portion 103 thereof due to the control of the assembly control circuit 306. Although the shifted distance in the searching pattern shown in FIG. 4 depends on the hole size of the collar 108, the size of the shaft 101 and the relative position between the collar 108 and the shaft 101, etc., it is selected experimentaly. Next, when the sequence controller 300 detects the signals through the selector 302 that the collar 108 has contacted to the step portion 103 of the shaft 101, the positioning mechanism 107 is stopped moving along the Z coordinate axis and moved back by the predetermined distance. Then, the positioning mechanism 107 repeats the insertion of the collar 108 to the step portion 103 of the shaft 101, the operation of which is as same as that has been described above. If the collar 108, however, is inserted onto the shaft at the step portion 103 thereof only by the control of the assembly control circuit 306, the positioning mechanism 107 need not to operate in accordance with the searching pattern. In other words, the operation of the control circuit without the assembly control circuit 306 is more complicated than that of the assembly control circuit 306 and takes more time in the above embodiment, since it may includes the operation due to the searching pattern. However, the operation of the control circuit without the assembly control circuit 306 can assemble the collar and the shaft having the complicated shape. Further, the collar may be completely assembled to the shaft only by the operation of the control circuit without the assembly control circuit 306. It is, however, better to utilize the control circuit including the assembly control circuit 306 in order to shorten the times for the assembly process.

Figure 3:
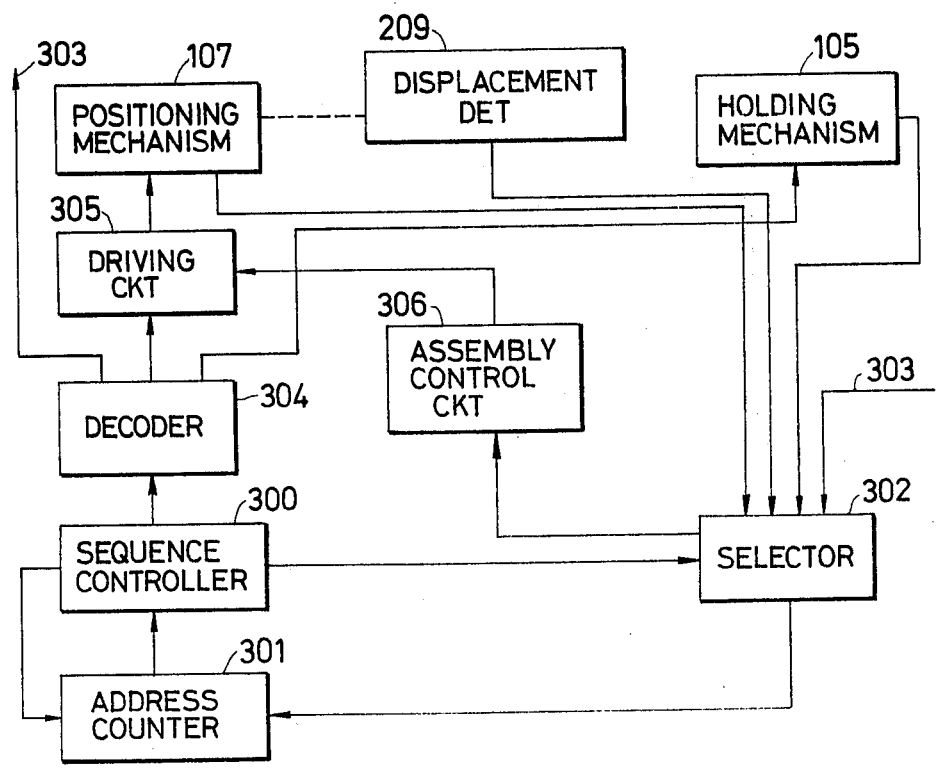
FIG. 3 is a schematic block diagram of the automatic assembly control apparatus of this invention.
Figure 2:
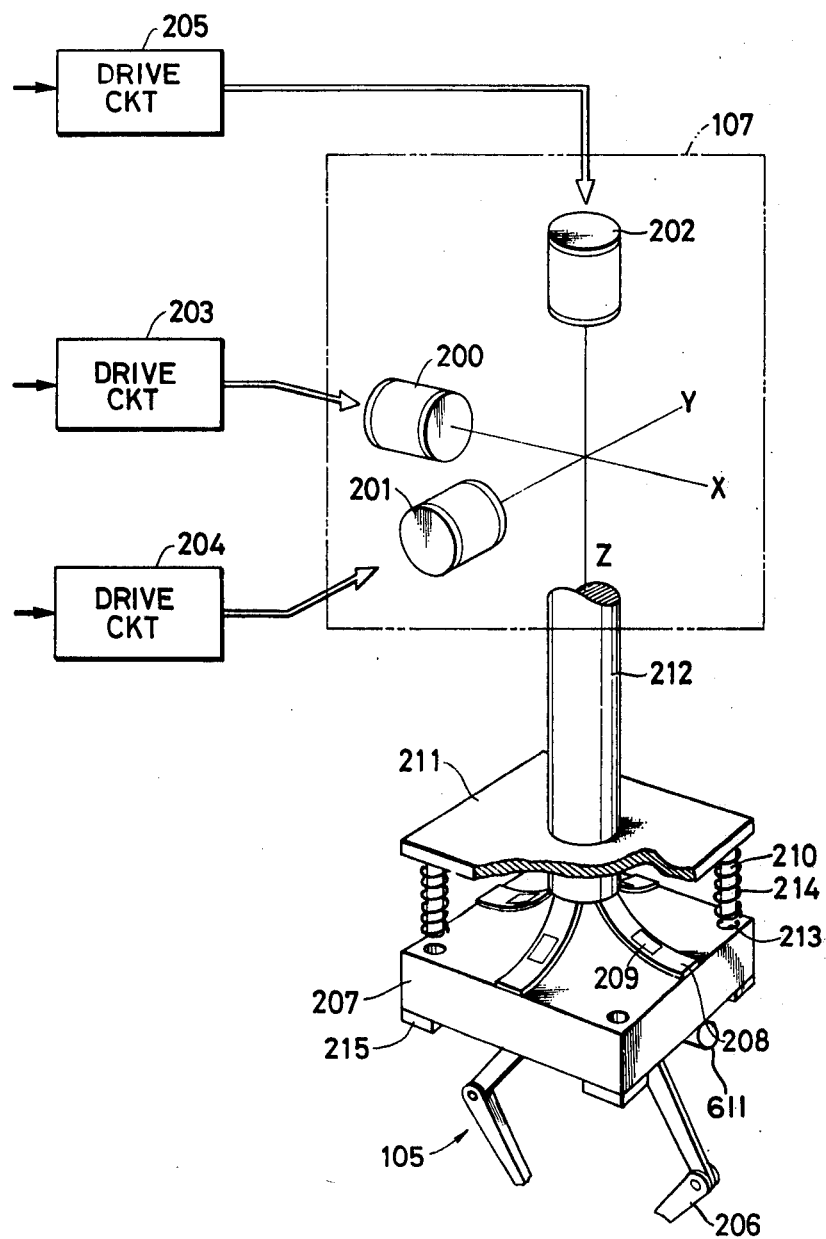
FIG. 2 is a schematic perspective view of a holding mechanism and an elastic mechanism coupled to a positioning mechanism which are used in an embodiment of this invention.
Figure 5:
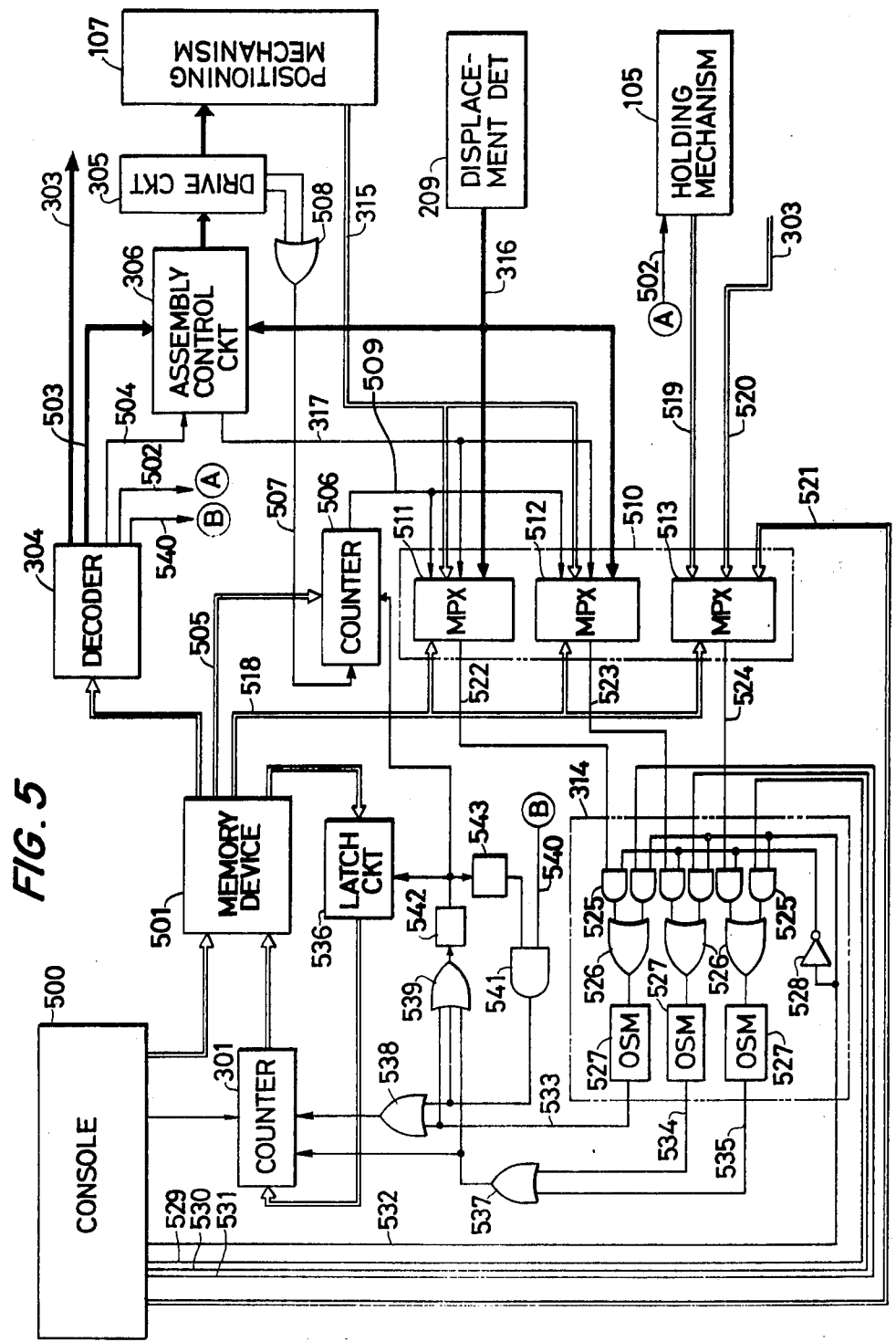
FIG. 5 is a circuit diagram of the automatic assembly control apparatus shown in FIG. 3 in more detail.

The control circuit shown in FIG. 3 will be explained in more detail in connection with FIGS. 5 and 6, in which the elements shown in FIGS. 1, 2 and 3 are designated the same reference numerals. The sequence controller comprises a console 500, and the memory device 501 which may be a read only memory (ROM). The contents of the memory device 501, which are stored previously as described above, are read out due to a demand from the console 500 and an order from the address counter 301. The output signals from the memory device 501 are timing signals supplied to the external devices 303 through the decoder 304, driving signals 502 supplied to the holding mechanism 105 through the decoder 304 to hold the collar 108, driving signals 503 supplied to the drive circuits 305 comprising the drive circuits 203, 204 and 205 through the decoder 304 for driving the positioning mechanism 107 so that the collar 108 is positioned to the shaft 101 and is moved to the Z coordinate axis, a gate signal 504 for gating the assembly control circuit 306, and data signals 505 for setting the counter 506. The counter 506 sets the data relating to the shifted distance of the positioning mechanism 107, the contents of which are counted down by the pulse signals 507 which are generated by the drive circuit 305 for driving the positioning mechanism 107. In a case, for instance, where the positioning mechanism 107 is moved in the direction of the X coordinate axis, the counter 506 sets the data with respect to the predetermined distance stored previously in the memory device 501 and then its contents are counted down by the pulse signals which are generated by the drive circuit 203. One of the output signals of the driving circuits 203, 204 and 205 is supplied to the counter 506 through an OR gate circuit 508 since one of the drive circuits 203, 204 and 205 is actuated in the inserting operation. When the output 509 of the counter 506 becomes a zero, the sequence controller 300 detects it and supplies the gate signal 504 to the assembly control circuit through the decoder 304 in order to stop the operation of the positioning mechanism 107, and then a next step will be taken. The selector 302 comprises a gate circuit 510 having a plurality of multiplexers 511, 512 and 513, and a switching circuit 314. The multiplexers 511 and 512 are supplied the output signals 315, 316, 317 and 509 of the position detectors (not shown) placed on the positioning mechanism 107, the displacement detectors 209, the assembly control circuit 306 and the counter 506, respectively, as well as the control signals 518 from the memory device 501 in order to selectively gate them. The multiplexer 513 is supplied the output signals 519, 520 and 521. The output signal 519 is from the detector (not shown) placed on the holding mechanism 105, which detects the end of the operation of the holding mechanism 105. The output signal 520 is the end signal of the operation as to the external devices 303. The output signal 521 is the start signal for the assembly process from the console 500 operated by a man.

The outputs 522, 523 and 524 of the multiplexers 511, 512 and 513 selected by the output 518 are supplied to the switching circuit 314, respectively. The switching circuit 314 comprises AND gate circuits 525, OR gate circuits 526, one shot multivibrators 527 and an inverter circuit 528. The outputs 522, 523 and 524 of the multiplexers 511, 512 and 513 are converted into pulse signals by the one shot multivibrators 527, respectively. On the other hand, the switching circuit 314 is supplied signals 529, 530 and 531 from the console 500 and is so constructed that the signals from the console 500 and the gate circuit 510 can be selected by a selection signal 532. Accordingly, before the sequence controller 300 will take the assembly process for a plurality of pairs, each pair of which is the collar and the shaft, each step programmed in the memory device 501 can be manually checked, for instance, the shifted distance of the positioning mechanism 107, so that the contents of the memory device 501 in the each step can be compensated if it is needed. The outputs 533, 534 and 535 are supplied to the address counter 301, a latch circuit 536 and the counter 506 through OR gate circuits 537, 538 and 539. The outputs 522 and 523 are used as the signals for pre-setting the address counter 301 or counting, for setting the latch circuit 536 and for pre-setting the counter 506. A signal 540 for a jump address, which is the output of the decoder 304, is supplied to an AND gate circuit 541. When the signal 540 and the end signal of each step for the assembly process are applied to the AND gate circuit 541, the the contents of the address counter 301 is jumped to a next step. Reference numerals 542 and 543 designate delay circuits.

Figure 7A:
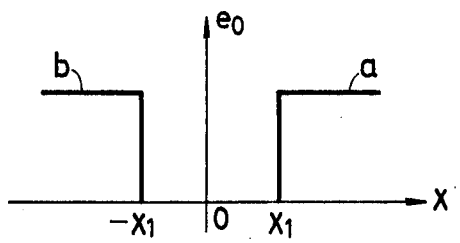
FIGS. 7a, 7b and 7c are diagrams for explaining operations of detectors which are applied to an embodiment of this invention.
Figure 7B:
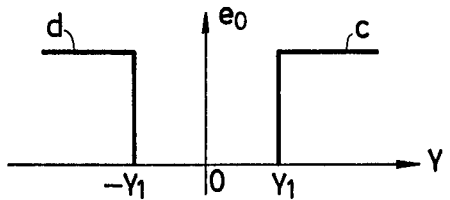
Figure 6:
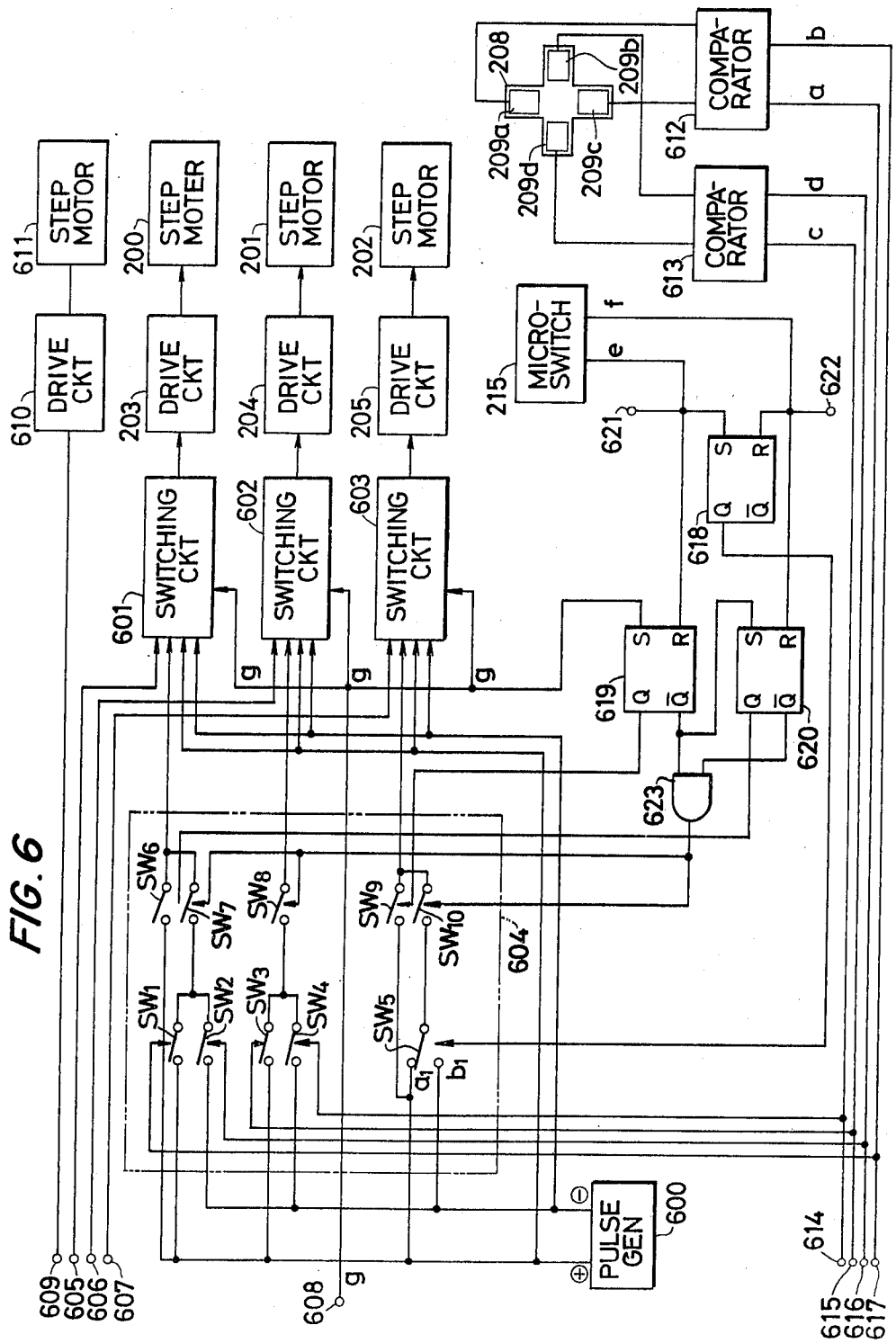
FIG. 6 is a circuit diagram of an assembly control circuit shown in FIG. 5 in more detail.

Referring now to FIG. 6, the positive and negative pulse trains generated by a pulse generator 600 are applied to one input terminal of signal switching circuits 601, 602 and 603 through a switching circuit 604 comprising switches $SW_1 \sim SW_{10}$. The other input terminals 605, 606 and 607 are connected to the decoder 304 for receiving the output signals 503 and 504 therefrom and for controlling the movement of the positioning mechanism 107. The outputs of the signal switching circuits 601, 602 and 603 are selectively derived in response to the gate signal 504 applied to a terminal 608 connected to the decoder 304, whereby the operation of the control circuit without the assembly control circuit 306 and the operation of the assembly control circuit 306 are switched. For example, when the "on" signal g is applied, the signal switching circuits 601, 602 and 603 transmit signals from the switching circuit 604, whereas when the "off" signal g is applied, the signals from the decoder 304 are transmitted. The outputs of the signal switching circuits 601, 602 and 603 are applied to the driving circuits 203, 204 and 205 of the step motors 200, 201 and 202, respectively. In response to the positive pulse train, the drive circuits 203, 204 and 205 control the step motors 200, 201 and 202 so as to effect rotation in the clockwise direction, whereas in response to the negative pulse train, they are rotated in the counter-clockwise direction. The signals 502 for controlling the holding mechanism 105 are applied to a terminal 609 and then to a drive circuit 610 for controlling a step motor 611 which, in turn, controls the actuation of the arms 206 of the holding mechanism 105. The deflection in the X- direction is detected by the strain gauges 209a and 209c whereas the deflection in the Y-direction, by the strain gauges 209b and 209d. The signals derived from the strain gauges 209a and 209c are applied a comparator 612. When the relative position of the holding mechanism 105 in the X direction is in excess of a predetermined value $X_1$, the signal a (See FIG. 7a) is obtained, but when the deviation of the holding mechanism 105 is in excess of a predetermined value $-X_1$, the signal b is obtained. The signals derived from the strain gauges 209b and 209d are applied to a comparator 613 so that when the deviation in the Y- direction is in excess of a predetermined value $Y_1$, the signal c (See FIG. 7b) is obtained but when the deviation is in excess of a predetermined value $-31 Y_1$, the signal d is obtained. The switches $SW_1$ to $SW_4$ in the switching circuit 604 are actuated in response to these signals $a$, $b$, $c$ and $d$. On the other hand, terminals 614, 615, 616 and 617 of these signals $a$, $b$, $c$ and $d$ are connected with the multiplexers 511 and 512 of the gate circuit 510 forming part of the signals 316 supplied thereto, respectively.

Figure 7C:
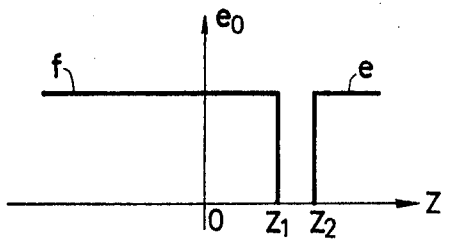

The deviation of the drive shaft 212 in the Z- direction of the positioning mechanism 107 is detected by the microswitches 215 which outputs the signal $e$ (See FIG. 7c) when the deviation is in excess of a predetermined value $Z_2$, but delivers the signal $f$ when the deviation is less than a predetermined value $Z_1$. Flip-flops 618, 619 and 620 are actuated in response to the signals $e$ and $f$, and in response to the outputs of the flip-flops 618, 619 and 620, the switches $SW_5 - SW_{10}$ are actuated. Terminals 621 and 622 of these signals $e$ and $f$, also, are connected to the multiplexers 511 and 512 of the gate circuit 510 forming part of the signals 316 supplied thereto.

Next, the mode of the operation of the device shown in FIGS. 5 and 6 will be described. In response to the control signals applied to the terminals 605, 606, 607 and 609 from the memory device 501 through the decoder 304 when the gate signal $g$ of the line 504 actuates the switching circuits 601, 602 and 603 such that the control signals applied to the terminals 605, 606 and 607 control the switching circuits 601, 602 and 603 and the driving values from the pulse generator 600 are supplied to the drive circuits 203, 204 and 205, the step motors 611, 200, 201 and 202 are actuated so that the holding mechanism 105 holds the collar 108 and the hole center of the collar 108 is positioned in rough to the center of the shaft 101. The end signals of these operations are derived from the possible detectors placed on the positioning mechanism 107 and the detectors placed on the supporter 207 of the holding mechanism 105 and supplied to the multiplexers 511, 512 and 513. Accordingly, the control signals 518 from the memory device open the necessary gates of the multiplexers 511, 512 and 513, the outputs of which change the contents of the address counter 301 and then a next step is taken. The gate signal $g$ from the decoder 304 is applied to the terminal 608 so that the signal switching circuits 601, 602 and 603 are switched into the mode for transmitting therethrough the output of the switching circuit 604, and the flip-flop 619 is set so that its Q output becomes 1 to close the switch $SW_9$. As a result, the positive pulse train is applied from the pulse generator 600 through the switch $SW_9$ and the signal switching circuit 603 to the drive circuit 205 so that the step motor 202 is rotated so as to cause the drive shaft 212 to move down in the Z- direction. When the drive shaft 212 is driven downwardly further even after the collar 108 has made into the contact with the top of the shaft 101, the free ends of the rod 210 actuate the microswitches 215, so that the signal $e$ is applied to the flip-flop 619. As a result, the flip-flop 619 is reset whereas the flip-flop 618 is set so that the switch $SW_9$ is opened, and the switch $SW_5$ closes its contact $b_1$ in response to the Q output of the flip-flop 618. The input to the step motor 202, therefore, is interrupted so that the collar 108 is forced into contact with the top of the shaft 101 with the predetermined constant pressure.

When the flip-flop 619 is reset, its Q output becomes 1 so that the flip-flop 620 is set. In response to the Q output of the flip-flop 620, the switch $SW_6$ is closed so that the positive pulse train from the pulse generator 600 is applied to the drive circuit 203 of the X-direction step motor 200. The drive shaft 212 of the positioning mechanism 107 is caused to move in the X-direction and the shaft 101 is partly inserted into the hole 109 of the collar 108, so that the leaf springs 208 and the coiled springs 214 are returned to their normal position. As a result, the signal $f$ is derived from the microswitch 215 and applied to the flip-flop 620 so that the latter is reset. Both Q outputs of the flip-flops 619 and 620 become 1 so that, in response to the output of a AND gate 623, the switches $SW_7$, $SW_8$ and $SW_{10}$ are closed. The Q output of the flip-flop 618 which is reset in response to the signal $f$ becomes 0 so that the switch $SW_5$ has its contact $a_1$ closed. The actuation of the switches $SW_1$ to $SW_4$ is controlled in response to the output signals of the comparators 612 and 613 which vary in response to the deviation of the holding mechanism 105 from the positioning mechanism 107. For example, when the deviations in both the X- and Y- directions of the holding mechanism 105 with respect to the positioning mechanism 107 are in excess of predetermined values $X_1$ and $Y_1$, the comparators 612 and 613 deliver the signals $a$ and $c$ in response to which the switches $SW_2$ and $SW_4$ are closed. As a result, the negative pulse train is applied from the pulse generator 600 to the drive circuits 203 and 204 of the step motors 200 and 201 so that the positioning mechanism 107 is driven in both the X- and Y- directions until the deviations in the X- and Y- directions are within the ranges between $X_1$ and $-X_1$ and between $Y_1$ and $-Y_1$, respectively. The strain gauges are generally not sensitive to the deflections within these ranges. The pulse train is applied through the switches $SW_5$ and $SW_{10}$ to the step motor 202 until the microswitches 215 deliver the signal $e$, so that the collar 108 is normally pressed against the shaft 101 under a constant force.

The collar 108, however, may not be inserted onto the shaft 101 by the inserting operation as have been described above. In this case, the sequence controller 300 derives the gate signal 504 to the terminal 608 in order to put under the control thereof after a predetermined period of time, which is counted by a timer (not shown). At same time, the memory device 501 sets the data with respect to the distance, which the positioning mechanism 107 is moved back, to the counter 506 and drives the Z- direction step motor 202 until the output 509 of the counter 506 becomes 0. When the 0 output 509 is derived from the multiplexer 511 by the gate signal 518 from the memory device 501, it is supplied to the address counter 301 through the switch circuit 314 and the OR gate 538, to the latch circuit 536 and the counter 506 through the OR gate 539 and the delay circuit 542, so that the memory device 501 delivers a stop signal to stop the Z- direction step motor 202, the contents of the address counter 301 are changed for a next step and the counter 506 is pre-set for a next step.

Figure 4:
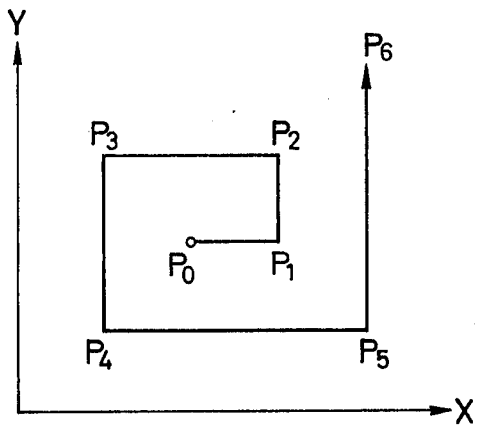
FIG. 4 is a diagram of a searching pattern which is applied to an embodiment of this invention.

Next, the sequence controller 300 is prepared to drive the positioning mechanism 107 in accordance with the searching pattern shown in FIG. 4. First of all, the memory device 501 sets the data with respect to the distance to move the positioning mechanism 107 from the position $P_0$ to the position $P_1$, to the counter 506, the contents of which are stored in the latch circuit 536 at same time and the X- direction step motor 200 is driven. When the output 509 of the counter 506 becomes 0, the X- direction step motor 200 is stopped in its operation and the driving shaft 212 is moved down in the Z- direction in response to drive the Z-direction step motor. At that time, the gate circuit of the multiplexer 512 connected to the terminal 621 is opened by the gate signal 518 in order to detect the signal $e$ of the microswitch 215. When the collar 108 is not inserted onto the shaft 101, the microswitch 215 delivers the signal e to the multiplexer 512 so that a next searching motion, that is, the movement of the positioning mechanism 107 from the position $P_1$ to the position $P_2$ is performed. If the signal f of the microswitch 215 is obtained over a predetermined period of time while the Z- direction step motor 202 is driven, it is detected that the collar 108 has been inserted onto the shaft 101. This detecting signal from the multiplexer 511 is supplied to the AND gate 541 through the switching circuit 314 and the OR gate 539 and, at same time, the jump signal 540 from the decoder is supplied to the AND gate 541 so that the contents of the address counter are changed. Accordingly, the searching operations thereafter are omitted and the operation of the sequence controller 300 is jumped to the operation for inserting the collar 108 from the top of the shaft 101 to the step portion 103 thereof due to the control of the assembly control circuit 306. Next, the operation for inserting the collar to the shaft at the step portion 103 thereof is performed in accordance with the searching pattern as have been described above, as well as at the step portion 104 of the shaft 101. When the collar 108 is inserted to a predetermined distance of the shaft 101, the sequence controller 300 stops its operation so that the assembly is completed and a next assembly is prepared.

In the above embodiment, the outputs e and f of the microswitch 215 have been used as the detecting signals for detecting whether or not the collar has been inserted to the shaft, but the outputs a, b, c and d of the comparators 612 and 613 may be utilized. For instance, the average of the outputs a, b, c and d may be used. Further, the deflection of the holding mechanism 105 from the positioning mechanism 107 with respect to the X- or Y- coordinate axis is detected when the signal c and d, and the signals a and b are picked up separately from each other, so that the searching pattern becomes simple and the assembly process is shortened in times.

While only a few forms of this invention have been shown and described, many modifications will be apparent to those skilled in the art within the spirit and scope of the invention as set forth in the appended claims.

We claim:

1. An automatic assembly control apparatus for assembling together first and second members comprising:
    first means for holding one of said first and second members;
    second means for driving a drive shaft along the respective axes of a selected, coordinate system;
    third means for elastically coupling said first means to said drive shaft;
    fourth means, responsive to the displacement of said third means, relative to said first means, for generating a signal representative thereof;
    fifth means for selecting a predetermined signal of said signals generated from said fourth means;
    sixth means for controlling said second and fifth means, which includes a memory means and an address counter means, said memory means storing predetermined assembly steps for assembling said first and second members, said address counter means being coupled to said memory means and so constructed that the contents of said address counter means are changed in response to the output from said fifth means, said fifth means selecting the predetermined signal in response to an output of said sixth means.

2. An automatic assembly control apparatus according to claim 1, wherein said fifth means comprises a switching circuit means and a gate means, said signals generated from said fourth means being applied to said gate means and gated by the control signals derived from said sixth means.

3. An automatic assembly control apparatus according to claim 2, wherein said second means further includes a signal generating means for positioning said first means, said signal generating means being coupled with said gate means.

4. An automatic assembly control apparatus according to claim 3, wherein said sixth means further includes manual switches and said switching circuit means is so designed that one of the signals from said manual switches and the output signals from said gate circuit is selected.

5. An automatic assembly control apparatus according to claim 1, further including seventh means, responsive to said signal generated by said fourth means, for controlling said second means in accordance therewith, said seventh means including a switching means which is controlled by said sixth mean to actuate said seventh means.

6. An automatic assembly control apparatus according to claim 5, wherein said fourth means comprises first detecting means for detecting the relative displacement between said drive shaft and said first means, and second detecting means for detecting the relative displacement between said drive shaft and one of said first and second members in the direction of an axis along which said first and second members are assembled together.

7. An automatic assembly control apparatus according to claim 6, wherein said seventh means comprises
    a pulse generator for generating respective trains of positive and negative pulses;
    first and second switching circuits for selectively transmitting therethrough one of said positive and negative pulse trains in response to the output of said first detecting means.
    a third switching circuit for selectively transmitting therethrough one of said positive and negative pulse trains in response to the output of said second detecting means, and
    respective step motors adapted to be rotated in a direction corresponding to the polarity of said positive and negative pulse trains transmitted through said first, second and third switching circuits.

8. An automatic assembly control apparatus according to claim 6, wherein said first detecting means and said second detecting means are connected with said fifth means.

9. A method of controlling an automatic assembly control device for assembling together first and second members, said method comprising the steps of:
    a. automatically positioning in rough said first member to said second member and moving said first member in the direction of an axis along which said first and second members are assembled together;
    b. automatically stopping the movement of said first member in the direction of said axis when said first member contacts said second members;
    c. automatically moving back said first member in the direction of said axis to make said first member free from said second members;

d. alternatively moving said first member within a plane perpendicular to said axis and said first member in the direction of said axis in order to insert said first member onto said second member; and e. inserting said first member onto said second member to effect an assembly of said first and second members.

10. A method according to claim 9, wherein the first member is provided with a hole therein and said second member is an elongated member with a projection thereon, the first and second members in the assembled condition thereof having the projection of the second member lying within the hole of the first member.

11. A method according to claim 9, wherein the first member is a collar member having a hole therethrough and the second member is a drive shaft of a motor having at least one stepped portion along the length thereof, the first and second members in the assembled condition thereof having the collar member positioned on the drive shaft in the region of the stepped portion.

12. A method of controlling an automatic assembly control device for automatically assembling together first and second members, the device including:

first means for holding one of the first and second members;

second means for driving a drive shaft along the respective axes of a selected coordinate system;

third means for elastically coupling the first means to the drive shaft;

fourth means, respective to the displacement of the third means, relative to the first means, for generating a signal representative thereof;

fifth means for selecting a predetermined signal of the signals generated from the third means;

sixth means for controlling the second and fifth means, which include a memory means and an address counter means, the memory means storing predetermined assembly steps for assembling the first and second members, the address counter means being coupled to the memory means and constructed so that the contents of the address counter means are changed in response to the output from the fifth means; and seventh means, responsive to the signal generated by the fourth means, for controlling the second means in accordance therewith, the seventh means including a switching means which is controlled by the sixth means to actuate the seventh means; the method comprising the steps of automatically positioning in rough the first member to the second member and moving the first member in the direction of an axis along which the first and second members are assembled together;

automatically stopping the movement of the first member in the direction of the axis when the first member contacts the second member;

automatically moving back the first member in the direction of the axis to make the first member free from the second member;

alternatively moving the first member within the plane perpendicular to the axis and the first member in the direction of the axis in order to insert the first member onto the second member;

effecting relative movement between the first means and the second means in the contact between the first and second members, so that the drive shaft may be caused to move toward the center while the member which is held by the first means is pressed against the other member under a predetermined pressure, thereby effecting a course alignment of the axis of each of the members;

moving the drive shaft along prescribed directions so that the displacement of the third means interposed between the first and second means may be restored, thereby correcting the position of the member held by the first means; and automatically assembling the first and second members together.

* * * * *